US008421594B2

(12) United States Patent
Anders

(10) Patent No.: US 8,421,594 B2
(45) Date of Patent: Apr. 16, 2013

(54) TAG-BASED PERSONALIZATION

(75) Inventor: Paul B. Anders, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 12/753,652

(22) Filed: Apr. 2, 2010

(65) Prior Publication Data

US 2011/0241823 A1 Oct. 6, 2011

(51) Int. Cl.
*G05B 19/00* (2006.01)
(52) U.S. Cl.
USPC ......... 340/5.8; 340/5.74; 340/5.41; 340/5.42; 705/42; 705/43; 705/44; 705/64; 705/65; 705/66; 705/67; 705/68; 705/69; 705/70; 705/71; 705/72; 705/73; 705/74; 705/75; 705/76; 705/77; 235/375; 235/376; 235/379; 235/380; 235/381; 235/382; 235/383

(58) Field of Classification Search ............... 340/5.8, 340/5.74, 10.1, 5.41, 5.42; 705/42–44, 64–77; 235/77, 375–376, 379–383
See application file for complete search history.

(56) References Cited

U.S. PATENT DOCUMENTS

| 5,544,321 | A | 8/1996 | Theimer et al. | |
|---|---|---|---|---|
| 5,979,757 | A * | 11/1999 | Tracy et al. | 235/383 |
| 7,280,851 | B2 * | 10/2007 | Oba et al. | 455/566 |
| 7,284,692 | B1 * | 10/2007 | Douglass | 235/379 |
| 7,908,663 | B2 * | 3/2011 | Horvitz et al. | 726/27 |
| 8,213,863 | B2 * | 7/2012 | Rouffet | 455/41.2 |
| 2002/0051011 | A1 * | 5/2002 | Goto | 345/738 |
| 2002/0159088 | A1 * | 10/2002 | Yamakawa et al. | 358/1.15 |
| 2002/0188565 | A1 * | 12/2002 | Nakamura et al. | 705/42 |
| 2003/0120612 | A1 * | 6/2003 | Fujisawa et al. | 705/73 |
| 2004/0044576 | A1 * | 3/2004 | Kurihara et al. | 705/14 |
| 2004/0239777 | A1 * | 12/2004 | Nakamura et al. | 348/239 |
| 2004/0249758 | A1 * | 12/2004 | Sukeda et al. | 705/57 |
| 2005/0154919 | A1 * | 7/2005 | Noguchi et al. | 713/201 |
| 2005/0287998 | A1 * | 12/2005 | Tonouchi | 455/416 |
| 2007/0168488 | A1 * | 7/2007 | Deguchi et al. | 709/223 |
| 2007/0300309 | A1 * | 12/2007 | Naito | 726/27 |

(Continued)

FOREIGN PATENT DOCUMENTS

| EP | 1298842 | 4/2003 |
|---|---|---|
| JP | 2003-076624 A | 3/2003 |
| JP | 2006-244060 A | 9/2006 |
| JP | 2007-193762 A | 8/2007 |

OTHER PUBLICATIONS

Seattle pi Business—Software Notebook: Color is key to Microsoft's next-generation bar code, Apr. 15, 2007, 3 pages, http://www.seattleip.com/buisness/311712_software16.html.
Search Report, issued in EP Patent Application No. 11250410.5, mailed Oct. 5, 2011, 3 pages.

(Continued)

*Primary Examiner* — Benjamin C Lee
*Assistant Examiner* — Quang D Pham
(74) *Attorney, Agent, or Firm* — Scwabe, Williamson & Wyatt, P.C.

(57) ABSTRACT

Embodiments of methods and apparatus for tag-based personalization of kiosk computing devices are disclosed. In embodiments, an authentication server/system may receive, from a mobile device, a plurality data packets having data associated with a display tag of a kiosk computing device. The authentication system/server may, in response, instruct the kiosk to activate an account-specific mode based on an account associated with the mobile device. Other embodiments may be described and/or claimed.

15 Claims, 9 Drawing Sheets

U.S. PATENT DOCUMENTS

| | | | |
|---|---|---|---|
| 2008/0113654 A1* | 5/2008 | Miyazawa | 455/414.1 |
| 2008/0141351 A1 | 6/2008 | Park | |
| 2008/0177569 A1* | 7/2008 | Chen et al. | 705/2 |
| 2008/0251579 A1* | 10/2008 | Larsen | 235/380 |
| 2009/0048929 A1* | 2/2009 | Im | 705/14 |
| 2009/0172026 A1* | 7/2009 | Brownholtz et al. | 707/104.1 |
| 2009/0195402 A1* | 8/2009 | Izadi et al. | 340/686.6 |
| 2009/0227207 A1* | 9/2009 | Rouffet | 455/41.2 |
| 2009/0287576 A1* | 11/2009 | Suzuki | 705/16 |
| 2010/0117795 A1* | 5/2010 | Satou et al. | 340/10.1 |
| 2011/0313901 A1* | 12/2011 | Kletzer | 705/31 |

OTHER PUBLICATIONS

Official Letter, issued in EP Patent Application No. 11250410.5, mailed Oct. 20, 2011, 4 pages.

Response filed in EP Application No. 11250410.5, dated Feb. 29, 2012, 11 pages.

Office Action issued in EP Application No. 11250410.5, dated Apr. 11, 2012, 4 pages.

Office Action for JP 2011-081502, mailed Jun. 19, 2012, 4 pages.

* cited by examiner

TAG-BASED PERSONALIZATION

TECHNICAL FIELD

Embodiments of the present disclosure relate generally to computing systems, and in particular to remote personalization of a computing system, such as a digital kiosk, using a tag-based approach.

BACKGROUND

Conventional digital kiosk personalization often involves an RFID tag that the user must carry with them, such as for example in a wallet card, and the digital kiosk being equipped with a RFID tag reader. Alternatively, the kiosk may test for a biometric, or prompt the user for a username/password which requires that the user enter his or her credentials.

BRIEF DESCRIPTION OF THE DRAWINGS

Embodiments of the disclosure will be described by way of example, but not limitations, illustrated in the accompanying drawings in which like references denote similar elements, and in which.

DETAILED DESCRIPTION

Figure 1:
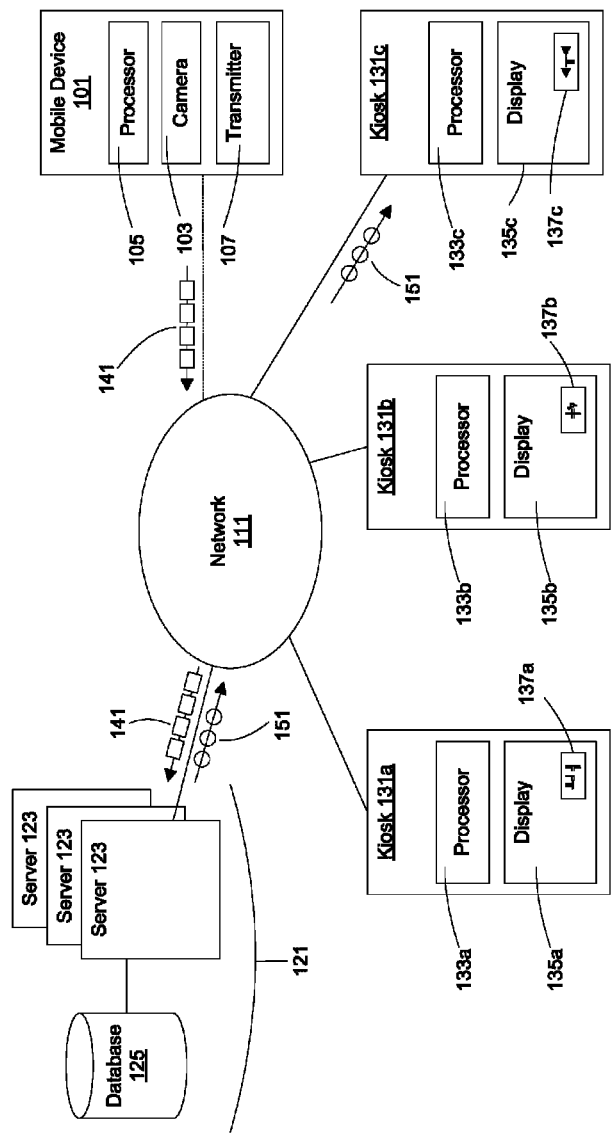
FIG. 1 illustrates various system components involved in tag-based personalization according to various embodiments.

Illustrative embodiments of the disclosure include, but are not limited to, methods, systems, and apparatuses for performing tag-based authentication, such as for example tag-based authentication of an account on a digital kiosk.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description, either in this Detailed Description or in the accompanying figures, should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Embodiments described herein may refer to a "kiosk" or to a "digital kiosk." A "kiosk" or "digital kiosk" may take various forms according to embodiments, such as for example, but not limited to, a computing device having a processor and a display. Kiosks according to embodiments may be deployed in public areas, or in common areas of a private or semi-public area (such as a school, research, or business building or campus), and kiosks according to embodiments may be configured to activate a "personalized user experience" or, more generally, an account-specific mode, upon account authentication. But it will be appreciated that embodiments described herein are not limited to kiosks or digital kiosks deployed in public areas or common areas. For example, a desktop or laptop computer, or other device, may be configured as described herein even though such devices are not deployed in a public, semi-public, or common area. And even where a description of one or more embodiments herein refers specifically to a kiosk or a digital kiosk, the intent of such description is not meant to limit the scope of such embodiment(s) to kiosks or digital kiosks unless the particular context allows no other reasonable interpretation. And it will be appreciated that a variety of device types may be configured as a "kiosk" as described herein.

Embodiments provide tag-based personalization methods, apparatuses, and systems that allow an account-specific mode to be activated on a computing device, such as a digital kiosk, without requiring the computing device to intermediate in the authentication portion of the personalization process. A mobile device may capture an image of a "display tag"—such as a two-dimensional (2D) color bar code—that is or has been displayed on a kiosk's display. The mobile device, in response to the capture of the display tag image may transmit data associated with the display tag image to an authentication server. The authentication server may identify the kiosk based on the associated data, identify an account associated with the mobile device, and send instructions to the kiosk to activate an account-specific mode (e.g., a "personalized user experience") associated with the account. The account may be identified by an account identifier.

In embodiments, the mobile device may be a mobile phone or other communications-enabled device having a digital camera. The mobile device may have client software configured to operate the mobile device to perform one or more functions described herein. The mobile device may be configured to capture images using the camera, such as for example by user operation. The display tag reader client software may be configured to determine that an image captured by the camera is an image of a display tag. The display tag reader client software may be configured to transmit a plurality of packets having data associated with the imaged display tag to an authentication server. The data associated with the imaged display tag may include pixel data of the imaged display tag, or the data may include some other representation of the digital display tag. In embodiments, either the mobile device or the installed client software may be configured to extract the display tag from the imaged display tag, and transmit the display tag, or data encoded in the display tag, to the authentication server.

The authentication server may be configured to receive data packets from one or more mobile devices. The authentication server may be configured to identify an account associated with the received data. The data packets may include an account identifier. Such an account may be a "user account" and the account identifier may be a username, a password, a telephone number, or other account identifier. The data may also include data associated with a display tag. The authentication server may be configured to identify a kiosk that displayed the display tag (e.g., a kiosk associated with the display tag) in response to receipt of the data packets. The authentication server may be configured to transmit instructions to the identified kiosk to activate an account-specific mode.

The digital kiosk may be configured to render a display tag on a display of the kiosk. The kiosk may be configured to periodically alter the display tag, or to periodically render a different display tag. The kiosk may also be configured to receive instructions to activate an account-specific mode. Such an account-specific mode may include personalized functions, display of account-specific information, and/or other features.

FIG. 1 illustrates various system components involved in tag-based personalization according to various embodiments. Mobile device 101 may include a camera 103, a processor 105, and a transmitter 107. Mobile device 101 may be configured to be communicatively coupled to one or more networks, such as network 111. Such communicative coupling may be wired or wireless, and embodiments are not limited to any specific type(s) of wired or wireless network connections. Accordingly, network 111 may be any type of suitable network, such as for example a cellular telephone network and/or the Internet. It will also be appreciated that network 111 may comprise one or more networks.

Also coupled to network 111 may be authentication system 121. Authentication system 121 may include server(s) 123 and database 125 (which may be stored within server(s) 123). Also, a plurality of kiosks, such as kiosks 131a, 131b, and 131c, may be coupled to network 111. Each kiosk may have processor 133 and display 135 (such as, for example, a cathode ray tube monitor, flat-screen monitor, liquid crystal display, plasma display, or other). Processors 133 may be configured to cause displays 135 to render display tags 137. It will be appreciated that display tag 137a may be different from display tags 137b and 137c, and that display tags 137b and 137c may also be different from each other. Display tags 137 may uniquely identify a specific kiosk 131. For example, display tag 137a may identify kiosk 131a. Kiosks 131 may be configured to periodically alter and/or replace display tags 137 with new display tags.

As is described elsewhere within this Detailed Description, mobile device 101 may be configured to capture an image of a display tag, such as for example display tag 137c. Processor 105 may be configured to transmit a plurality of data packets 141 to authentication system 121 in response to capture of an image of a display tag, such as display tag 137c. Plurality of data packets 141 may include data associated with display tag 137c such as, for example, pixel data or other data type.

Authentication system 121 may be configured, upon receipt of plurality of data packets 141, to identify the kiosk associated with display tag 137c. In embodiments, authentication system 121 may be configured to extract display tag 137c from pixel data included in plurality of data packets 141. In other embodiments, display tag 137c or data encoded within display tag 137c may be included in plurality of data packets 141. In various embodiments, authentication system 121 may be configured to identify—by for example performing a look-up to database 125—kiosk 137c based on the data associated with kiosk 137c included within plurality of data packets 141. For example, database 125 may be configured to cross-reference kiosks with their respective display tags. In embodiments where display tags 137 periodically alter or are replaced, database 125 and/or servers 123 may be configured to update database 125 with the new display tags. In other embodiments, kiosks 131 may be configured to alter or replace display tags 137 based on one or more algorithms shared between kiosks 131 and authentication system 121. In such embodiments, one or more components of authentication system 121 may be configured to also use such algorithms to determine current display tags 137 of one or more of kiosks 131.

Authentication system 121 may be configured to identify mobile device 101. Such identification may be based upon some account identifier associated with plurality of data packets 141. Such account identifier may or may not be included in plurality of data packets 141. Such account identifier may be, for example, a phone number, an account username and/or password, a mobile device identifier, or other. Authentication system 121 may be configured, in response to identification of kiosk 137c as the kiosk associated with the display tag data, to transmit instructions 151 to kiosk 137c. Instructions 151 may instruct 137c to activate an account-specific mode, based on the identification of the account associated with the account identifier. Instructions 151 may comprise one or more data packets.

In this way, an account-specific mode (e.g., a "personalized user experience") may be activated on kiosk 131c. But kiosk 131c may not, in embodiments, be configured to intermediate the authentication of mobile device 101 in order to activate an account-specific mode associated with mobile device 101. Rather, kiosk 131c may be configured merely to passively render display tag 137c and to activate the account-specific mode upon receipt of instructions 151.

Figure 2:
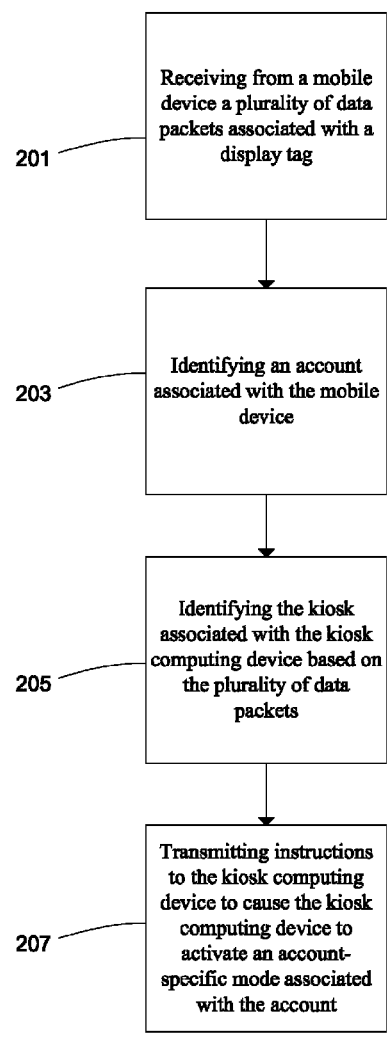
FIG. 2 illustrates a flow chart of tag-based personalization from the perspective of an authentication system according to various embodiments.

FIG. 2 illustrates a flow chart of tag-based personalization from the perspective of an authentication system according to various embodiments. An authentication system, according to embodiments, may receive from a mobile device a plurality of data packets associated with an account identifier, block 201 ("receiving from a mobile device a plurality of data packets, wherein the plurality of data packets includes data associated with a display tag"). The authentication system may identify an account associated with the mobile device, block 203 ("identifying the account associated with the mobile device"). The authentication system may identify a kiosk, based on the data in the plurality of data packets, block 205 ("identifying the kiosk associated with the kiosk computing device based on the plurality of data packets"). Identification of the kiosk may involve matching display tag data contained within the plurality of data packets to a database of display tags. Furthermore, such identification may include extracting the display tag from the display tag data. The authentication system may transmit instructions to the identified kiosk to activate an account-specific mode of the kiosk, block 207 ("transmitting instructions to the kiosk computing device to cause the kiosk computing device to activate an account-specific mode").

Figure 3:
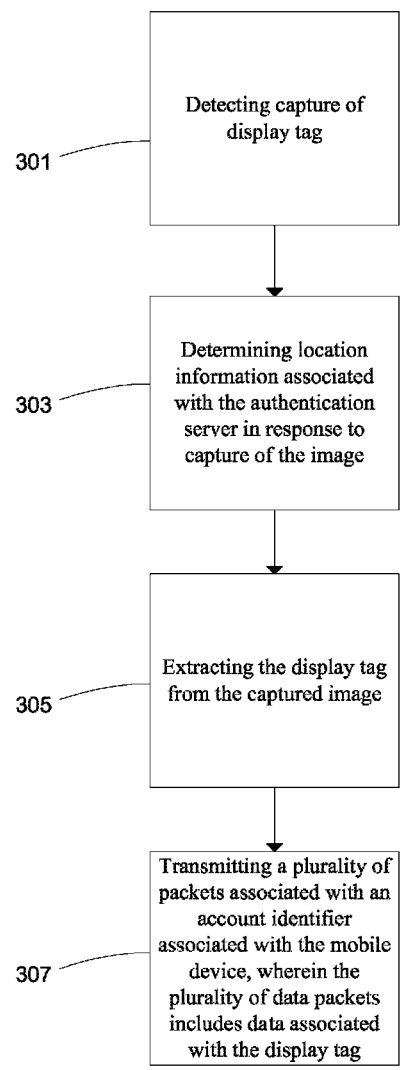
FIG. 3 illustrates a flow chart of tag-based personalization from the perspective of a mobile device according to various embodiments.

FIG. 3 illustrates a flow chart of tag-based personalization from the perspective of a mobile device according to various embodiments. A mobile device according to embodiments may detect the capture of an image of a display tag, block 301 ("detecting capture of display tag"). Such detection may comprise analyzing one or more images captured by a camera of the mobile device. Alternatively, such detection may comprise receiving a user input command to treat a captured image as a display tag image. The mobile device may then determine location information of an authentication server, block 303 ("determining location information associated with the authentication server in response to capture of the image"). Such location information may be, for example a Universal Resource Locator (URL), an Internet Protocol (IP) address, a telephone number, a Short Message Service (SMS) number, or some other location identifier. In embodiments, the location information may be pre-programmed into the mobile device. In embodiments, the mobile device may be configured to extract the location information from the display tag image.

The mobile device may extract the display tag from the captured display tag image, block 305 ("extracting the display tag from the captured image"). In alternate embodiments, the mobile device may not perform this operation, and the display tag may be extracted by an authentication server from pixel data transmitted to the authentication server by the mobile device. In either case, the mobile device may transmit a plurality of data packets including data associated with the display tag to the authentication server, block 307 ("transmitting a plurality of packets associated with an account identifier associated with the mobile device, wherein the plurality of data packets includes data associated with the display tag").

Figure 4:
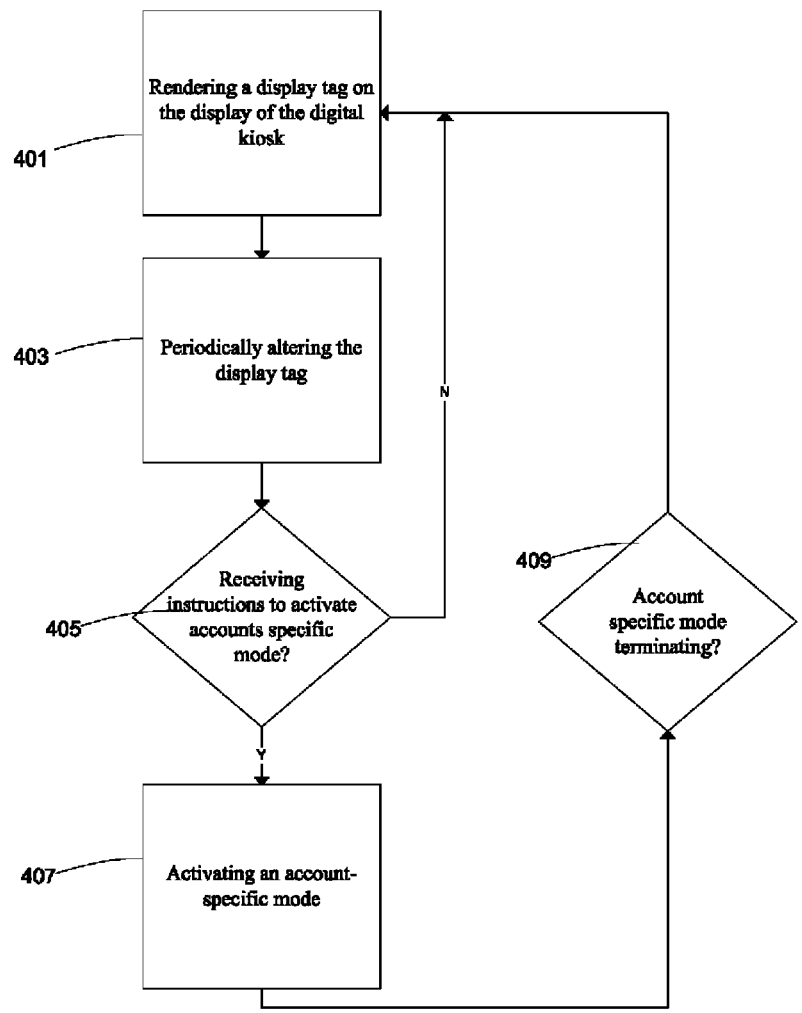
FIG. 4 illustrates a flow chart of tag-based personalization from the perspective of a digital kiosk according to various embodiments.

FIG. 4 illustrates a flow chart of tag-based personalization from the perspective of a digital kiosk according to various embodiments. A digital kiosk may render a display tag, block 401 ("rendering a display tag on the display of the digital kiosk"). Display tags according to embodiments may be, among other things, a bar code such as a two-dimensional black and white or color bar code. Display tags according to embodiments may be another type of graphical, textual, numerical representation capable of being rendered on a display. The digital kiosk may periodically alter the display tag, block 403 ("periodically altering the display tag"). Such periodic altering may be useful in thwarting sniffer or spoof-style attacks or other attempts to circumvent the authentication methods described herein.

Digital kiosks according to embodiments may determine whether instructions have been received to activate an account-specific mode, decision block 405 ("receiving instructions to activate accounts specific mode?"). The process elements in blocks 401, 403, and 405 may repeat until instructions are received. Upon receiving instructions, the digital kiosk may activate an account-specific mode, block 407 ("activating an account-specific mode").

Digital kiosks according to embodiments may determine whether the account-specific mode is terminated, decision block 409 ("account specific mode terminating?"). Upon termination of an account-specific mode, processes according to embodiments may return to block 401. Termination of an account-specific mode may include receiving termination instructions from an authentication system, or other device. The digital kiosk may itself be configured to accept termination instructions via user input (such as via a touch-screen input, pointer device, keyboard, or other user input device). The digital kiosk may be configured to terminate an account-specific mode after a predetermined period of time, or after a predetermined period of inactivity.

It should be noted that the order of processes depicted in FIG. 4 are not meant to imply that digital kiosks according to embodiments must alter a display tag (as shown in block 403) prior to receiving instructions to activate an account-specific mode, activating an account-specific mode, or terminating an account-specific mode.

Figure 5:
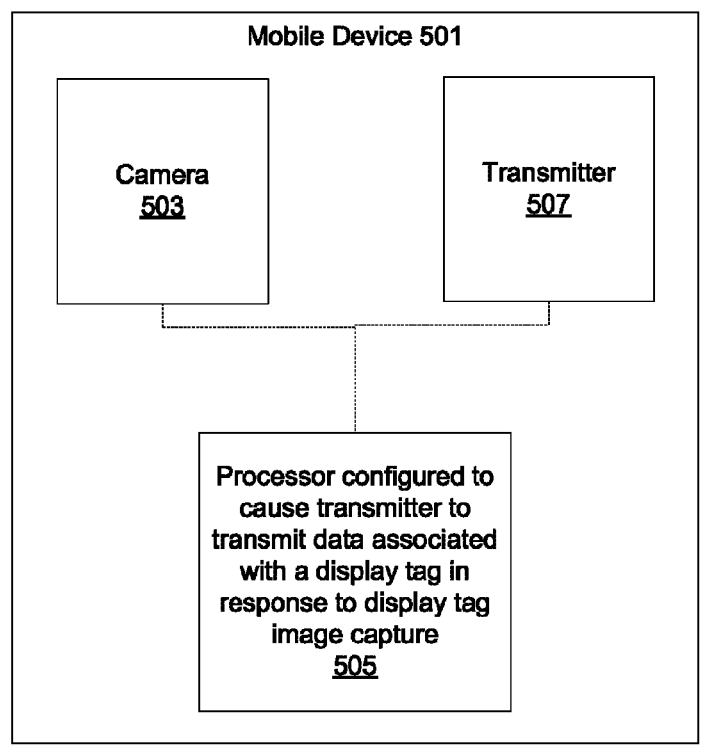
FIG. 5 illustrates a mobile device configured to participate in tag-based personalization according to various embodiments.

FIG. 5 illustrates a mobile device configured to participate in tag-based personalization according to various embodiments. Mobile device 501 may include a camera 503, processor 505, and transmitter 507. Camera 503 may be configured to capture images, such as for example under control of processor 505 and/or under user control. Mobile device 501 may include one or more memories (not shown) for storing captured images, and/or a plurality of programming instructions as are described elsewhere within this Detailed Description. Processor 505 may comprise an Application Specific Integrated Circuit (ASIC), a Field Programmable Gate Array (FPGA), and/or a processor configured to run a stored program. One or more functions of processor 505 may be carried out under the direction of a plurality of programming instructions, or may be configured as hardwired and/or programmed logic within processor 505.

Processor 505 may be configured to detect the capture of a display tag image by the camera. Processor 505 may be configured to accept user input instructions to treat a captured image as a display tag image. Processor 505 may be configured to determine location information—such as a URL or other location information—of an authentication server/system in response to the capture of the display tag image. The location information may be pre-programmed into mobile device 501. Mobile device 501 may be configured to accept such location information via user input. Mobile device 501 may be configured to extract such location information from the display tag image. In embodiments, the location information may be encoded into the display tag and processor 505 may be configured to extract such location information from the display tag. In embodiments, processor 505 may be configured to analyze the captured display tag image and extract the display tag from the image and cause the transmitter to transmit the display tag, and/or the encoded information from the extracted display tag, to the authentication server/system using the location information. Processor 505 may be configured to cause the transmitter to transmit pixel data of the captured display tag image to the authentication system/server.

Figure 6:
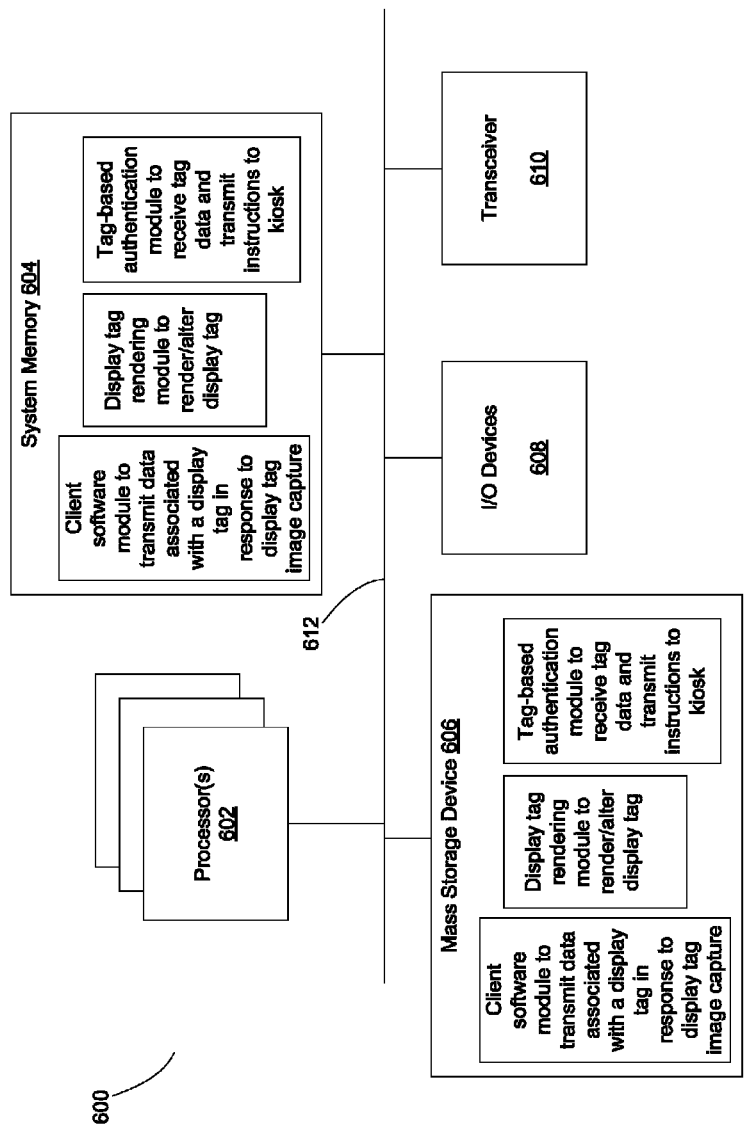
FIG. 6 illustrates an exemplary computing system configured to perform one or more aspects of tag-based personalization according to various embodiments.

FIG. 6 illustrates an exemplary computing system configured to perform one or more aspects of tag-based personalization according to various embodiments. As shown, computing system 600 includes one or more processors 602, and system memory 604. Additionally, computing system 600 includes mass storage device 606 (such as a diskette drive, hard drive, CDROM and so forth), input/output devices 608 (such as keyboard, cursor control and so forth) and transceiver 610 (such as network interface cards, modems and so forth). The elements are coupled to each other via system bus 612, which represents one or more buses. In the case of multiple buses, they may be bridged by one or more bus bridges (not shown).

Each of these elements may perform various conventional functions. Also, one or more software modules stored within system memory 604 and/or mass storage 606 may be executed by processor(s) 602 to practice or contribute to the practice of the methods described herein to implement a mobile device, authentication server, and/or a digital kiosk as described throughout this Detailed Description. The placement of such software modules into mass storage device 606 may be made in the factory, or in the field, through, for example, a distribution medium (not shown), such as a compact disc (CD), Digital Versatile Disc (DVD), or through transceiver 610 (from a distribution server (not shown)). In embodiments, the distribution medium may be an article of manufacture having programming instructions configured to implement one or more aspects of one or more methods as disclosed herein.

In various embodiments, computer system 600 may be a server, a desktop computer, a laptop computer, a tablet computer, smart phone, or other computer system. In other embodiments, computer system 600 may be embedded in a media player, a game console, a set-top box, diskless workstation, a digital recorder, or other device. Computer system 600 may be a mobile device, authentication server, and/or a digital kiosk according to embodiments previously described.

Figure 7:
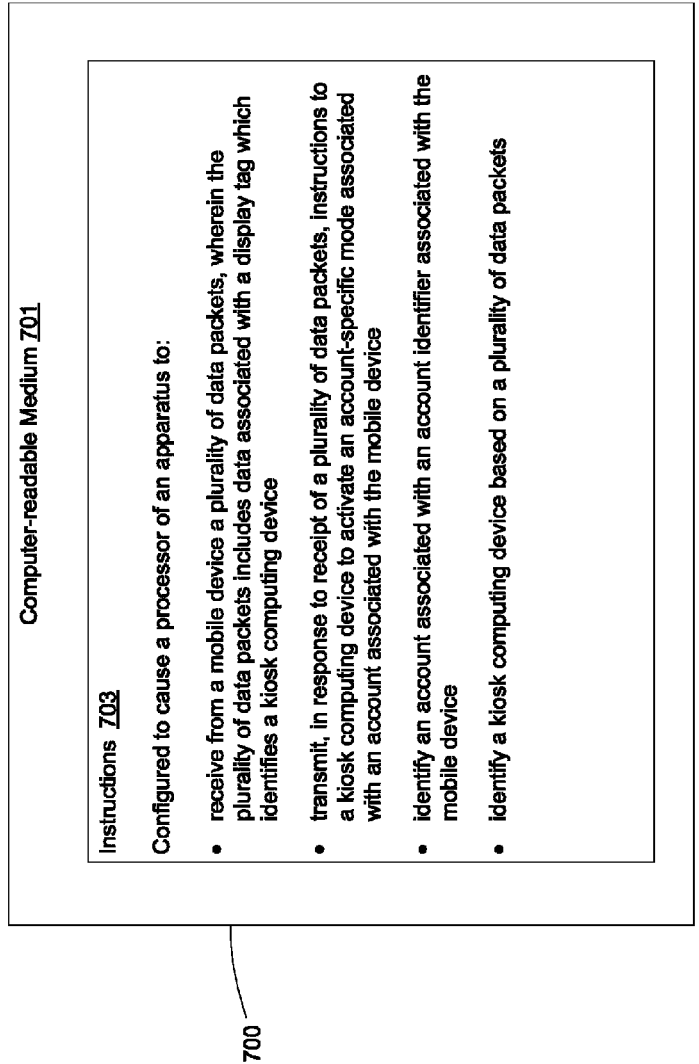
FIG. 7 illustrates a computer program product having programming instructions stored thereon and configured to cause one or more processors of an authentication system to perform various methods according to various embodiments.

FIG. 7 illustrates a computer program product having programming instructions stored thereon and configured to cause one or more processors of an authentication system to perform various methods according to various embodiments. Computer program product 700 may comprise a computer-readable medium 701 having a plurality of programming instructions 703. Computer program product 700 may comprise a Compact Disk (CD), a Digital Versatile Disk (DVD), another optical storage type, a magnetic tape, magnetic disk storage, or other storage type. Embodiments may have some or all of instructions 703 shown in FIG. 7. Embodiments may have other instructions not shown in FIG. 7. Instructions 703, in response to execution by processor(s) of a computing device, may cause the processor to perform one or more methods described within this Detailed Description to implement an authentication server, which may be part of an authentication system. In particular, instructions 703 may be configured to cause the processor(s) of a computing device to receive a plurality of data packets, wherein the plurality of data packets includes data associated with a display tag which identifies a kiosk computing device. Instructions 703 may be configured to cause the processor(s) of a computing device to transmit, in response to receipt of a plurality of data packets, instructions to a kiosk computing device to activate an account-specific mode associated with an account associated with an account identifier.

Figure 8:
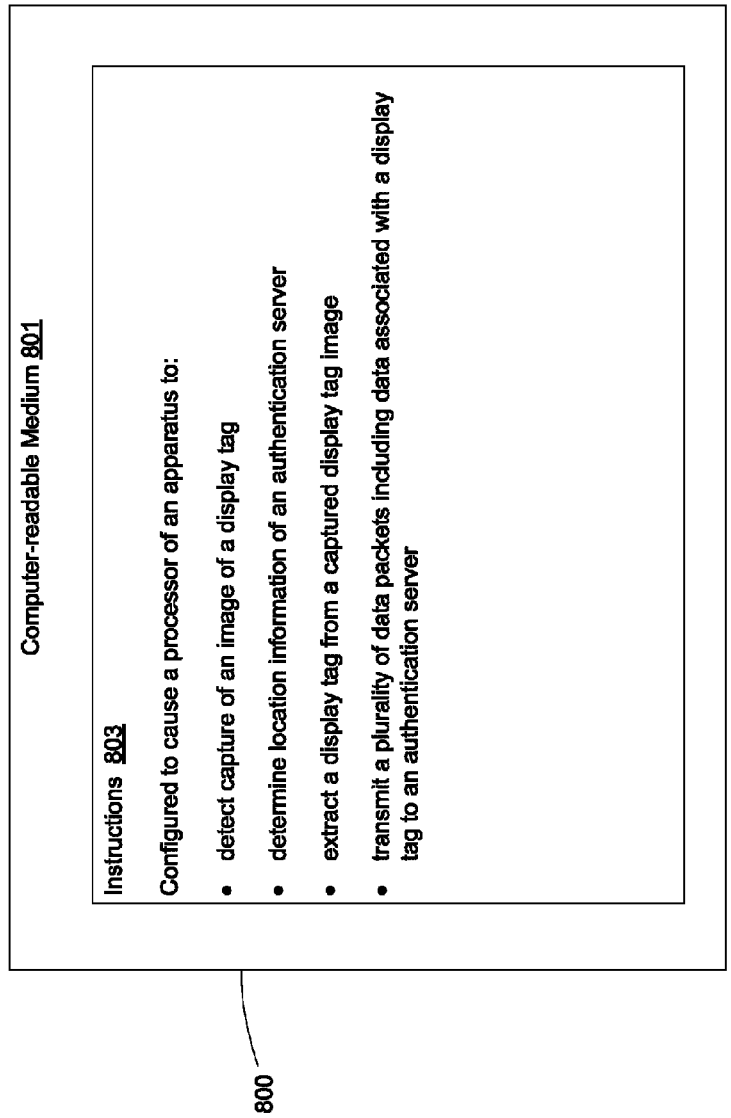
FIG. 8 illustrates a computer program product having programming instructions stored thereon and configured to cause one or more processors of a mobile device to perform various methods according to various embodiments.

FIG. 8 illustrates a computer program product having programming instructions stored thereon and configured to cause one or more processors of a mobile device to perform various methods according to various embodiments. Computer program product 800 may comprise a computer-readable medium 801 having a plurality of programming instructions 803. Computer program product 800 may comprise a Compact Disk (CD), a Digital Versatile Disk (DVD), another optical storage type, a magnetic tape, magnetic disk storage, or other storage type. Embodiments may have some or all of instructions 803 shown in FIG. 8. Embodiments may have other instructions not show in FIG. 8. Instructions 803, in response to execution by processor(s) of a computing device, may cause the processor to perform one or more methods described within this Detailed Description to implement a mobile device. In particular, instructions 803 may be configured to cause the processor(s) of a computing device to detect capture of an image of a display tag. Instructions 803 may be configured to cause the processor(s) of a computing device to determine location information of an authentication server. Instructions 803 may be configured to cause the processor(s) of a computing device to extract a display tag from a captured display tag image and to transmit a plurality of data packets including data associated with a display tag to an authentication server.

Figure 9:
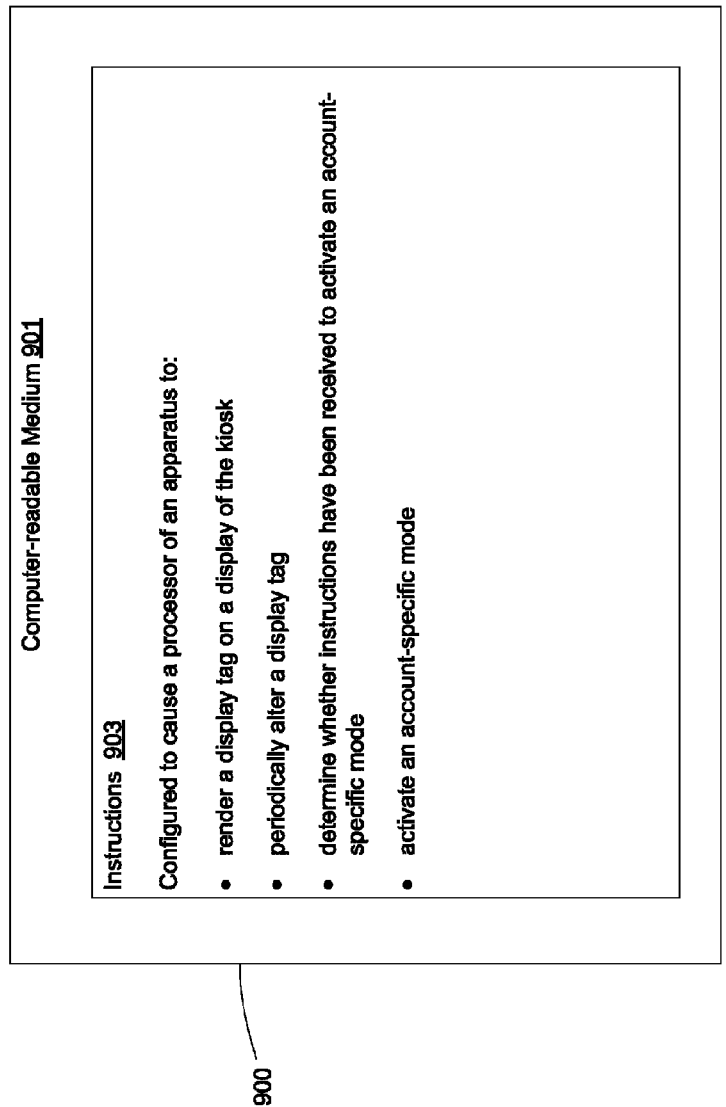
FIG. 9 illustrates a computer program product having programming instructions stored thereon and configured to cause one or more processors of a digital kiosk to perform various methods according to various embodiments.

FIG. 9 illustrates a computer program product having programming instructions stored thereon and configured to cause one or more processors of a digital kiosk to perform various methods according to various embodiments. Computer program product 900 may comprise a computer-readable medium 901 having a plurality of programming instructions 903. Computer program product 900 may comprise a Compact Disk (CD), a Digital Versatile Disk (DVD), another optical storage type, a magnetic tape, magnetic disk storage, or other storage type. Embodiments may have some or all of instructions 903 shown in FIG. 9. Embodiments may have other instructions not show in FIG. 9. Instructions 903 may cause, in response to execution by processor(s) of a computing device, the processor to perform one or more methods described within this Detailed Description to implement a digital kiosk. In particular, instructions 903 may be configured to cause a processor of a kiosk to render a display tag on a display of the kiosk. Instructions 903 may be configured to cause a processor of a kiosk to determine whether instructions have been received to activate an account-specific mode. Instructions 903 may be configured to cause a processor of a kiosk to activate an account-specific mode.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. For example, in alternate embodiments, a tag-based personalization method of the present disclosure may be practiced with a user reading and entering the tag into a mobile device, which in response, may transmit the tag information to an authentication system. This application is intended to cover any adaptations or variations of the embodiments discussed herein. Therefore, it is manifestly intended that the embodiments of the disclosure be limited only by the claims and the equivalents thereof.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A machine-implemented method, comprising:
   receiving, by an authentication server configured to control a plurality of kiosk computing devices through a network, from a mobile device, a plurality of data packets associated with a display tag and an account identifier, wherein the display tag identifies one of said plurality of kiosk computing devices and includes a network address of the authentication server, and wherein the account identifier identifies an account associated with the mobile device;

identifying, by the authentication server, the one of said plurality of kiosk computing devices based on the plurality of data packets;

authenticating, by the authentication server, the account associated with the mobile device utilizing the account identifier associated with the plurality of data packets; and transmitting, in response to said receiving, by the authentication server, instructions to the one of said plurality of kiosk computing devices to cause the one of said plurality of kiosk computing devices to activate an account-specific mode, wherein the account-specific mode is associated with the account associated with the mobile device.

2. The method of claim 1, wherein the display tag comprises a bar code, and wherein the data comprises pixel data of an image of the bar code.

3. The method of claim 1, wherein the display tag comprises a bar code, and wherein the data comprises the bar code.

4. The method of claim 1, wherein the account identifier comprises a phone number, a username, a password, or a mobile device identifier.

5. The method of claim 1, further comprising identifying, by the authentication server, the account identifier associated with the mobile device.

6. An apparatus, comprising:
a camera;
a transmitter; and
a processor coupled to the camera and to the transmitter, wherein the processor is configured to extract a bar code from an image of a display tag taken by the camera, and cause the transmitter to transmit, to an authentication server, a plurality of data packets associated with the extracted bar code and an account identifier, to cause the authentication server to identify one of a plurality of kiosks and authenticate an account associated with the apparatus based on the plurality of data packets and to cause the one of said plurality of kiosks to activate an account-specific mode associated with the authenticated account, wherein the display tag is associated with the one of said plurality of kiosks and the account identifier identifies the account associated with the apparatus, wherein the authentication server is configured to control the plurality of kiosks through a network, wherein the processor is further configured to determine an address in the network of the authentication server in response to capture of the image.

7. The apparatus of claim 6, wherein the apparatus is a mobile device and the account identifier is comprised at least in part of a phone number, a username, a password, or a mobile device identifier.

8. A non-transitory computer-readable medium having stored thereon a plurality of programming instructions configured to, in response to execution by a processor of an authentication server, cause the authentication server to:

transmit, to one of a plurality of kiosk computing devices, an address in a network of the authentication server to enable the one of said plurality of kiosk computing devices to encode the address into a display tag;

receive from a mobile device, a plurality of data packets associated with the display tag and an account identifier, wherein the display tag identifies the one of said plurality of kiosk computing devices and the account identifier identifies an account associated with the mobile device, wherein said plurality of kiosk computing devices are configured to be controlled by the authentication server through the network;

identify the one of said plurality of kiosk computing devices based on the plurality of data packets;

authenticate the account associated with the mobile device utilizing the account identifier associated with the plurality of data packets; and transmit, in response to said receive, instructions to the one of said plurality of kiosk computing devices to cause the one of said plurality of kiosk computing devices to activate an account-specific mode, wherein the account-specific mode is associated with the account associated with the mobile device.

9. The non-transitory computer-readable medium of claim 8, wherein the data packets are associated with an image of the display tag, and the plurality of programming instructions are further configured to cause the authentication server to extract, from the captured image of the display tag, a bar code associated with the kiosk computing device.

10. The non-transitory computer-readable medium of claim 8, wherein the account identifier is comprised at least in part of a phone number, a username, a password, or a mobile device identifier.

11. A kiosk computing device, comprising:
a display tag;
a display; and
a processor coupled to the display, and configured to activate an account specific mode of display for a mobile device, in accordance with instructions received from an authentication system provided in response to; receipt of data packets associated with the display tag and an account identifier from the mobile device, and authentication of an account associated with the mobile device utilizing the account identifier, wherein the kiosk computing device is one of a plurality of kiosk computing devices configured to be controlled by the authentication system through a network, wherein the processor is further configured to encode, into the display tag, an address within the network of the authentication server to enable the mobile device to decode the display tag and transmit the data packets to the authentication system and to enable the authentication system to identify the one of said plurality of kiosks based on the data packets.

12. The kiosk computing device of claim 11, wherein the display tag is a bar code, and wherein the data packets comprise pixel data of the bar code.

13. The kiosk computing device of claim 11, wherein the display tag is a bar code, and wherein the data packets comprises the bar code.

14. The kiosk computing device of claim 11, wherein the kiosk is further configured to render the display tag on the display of the kiosk computing device.

15. The kiosk computing device of claim 14, wherein the kiosk is further configured to periodically alter the display tag.

* * * * *